US010733540B2

(12) United States Patent
Kakhandiki et al.

(10) Patent No.: US 10,733,540 B2
(45) Date of Patent: Aug. 4, 2020

(54) ARTIFICIAL INTELLIGENCE AND KNOWLEDGE BASED AUTOMATION ENHANCEMENT

(71) Applicant: Automation Anywhere, Inc., San Jose, CA (US)

(72) Inventors: Abhijit Kakhandiki, San Jose, CA (US); Sridhar Gunapu, Santa Clara, CA (US)

(73) Assignee: Automation Anywhere, Inc., San Jose, CA (US)

( * ) Notice: Subject to any disclaimer, the term of this patent is extended or adjusted under 35 U.S.C. 154(b) by 0 days.

(21) Appl. No.: 16/371,074

(22) Filed: Mar. 31, 2019

(65) Prior Publication Data

US 2019/0325341 A1 Oct. 24, 2019

Related U.S. Application Data

(63) Continuation of application No. 14/939,715, filed on Nov. 12, 2015, now Pat. No. 10,289,959, which is a continuation-in-part of application No. 14/834,773, filed on Aug. 25, 2015, now Pat. No. 10,430,180, which is a continuation of application No. 13/925,522, filed on Jun. 24, 2013, now Pat. No.
(Continued)

(51) Int. Cl.
*G06N 5/04* (2006.01)
*G06N 20/00* (2019.01)
*G06N 3/08* (2006.01)

(52) U.S. Cl.
CPC ............... *G06N 20/00* (2019.01); *G06N 3/08* (2013.01); *G06N 5/04* (2013.01)

(58) Field of Classification Search
CPC ........................................................ G06N 5/04
See application file for complete search history.

(56) References Cited

U.S. PATENT DOCUMENTS 5,949,999 A 9/1999 Song et al.
5,983,001 A 11/1999 Boughner et al.
(Continued)

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).
(Continued)

*Primary Examiner* — Wilbert L Starks
(74) *Attorney, Agent, or Firm* — Prasad IP, PC

(57) ABSTRACT

This invention generally relates to a process, system and computer code for updating of computer applications based on collecting automation information related to a current application such as processing power, load, footprint, and performance attributes, determining a system automation profile; using an artificial intelligence based modeler for analyzing data, applying the data to an artificial intelligence model for training and predicting performance, adjusting the artificial intelligence model to achieve an updated automation criteria with optimal values, wherein the optimal values provide input to an automation criteria library for storing and updating a prior automation criteria, and exporting the upgraded automation criteria values for incorporation in a computer-to-be-updated, to achieve a reliable automatic update.

18 Claims, 3 Drawing Sheets

Related U.S. Application Data 9,462,042, which is a continuation-in-part of application No. 12/787,469, filed on May 26, 2010, now Pat. No. 8,504,803.

(60) Provisional application No. 62/130,068, filed on Mar. 9, 2015, provisional application No. 62/160,655, filed on May 13, 2015.

(56) References Cited

U.S. PATENT DOCUMENTS

| | | | |
|---|---|---|---|
| 6,133,917 | A | 10/2000 | Feigner et al. |
| 6,389,592 | B1 | 5/2002 | Ayres et al. |
| 6,427,234 | B1 | 7/2002 | Chambers et al. |
| 6,473,794 | B1 | 10/2002 | Guheen et al. |
| 6,496,979 | B1 | 12/2002 | Chen et al. |
| 6,640,244 | B1 | 10/2003 | Bowman-Amuah |
| 6,704,873 | B1 | 3/2004 | Underwood |
| 6,898,764 | B2 | 5/2005 | Kemp |
| 6,954,747 | B1 | 10/2005 | Wang et al. |
| 7,091,898 | B2 | 8/2006 | Arling et al. |
| 7,246,128 | B2 | 7/2007 | Jordahl |
| 7,398,469 | B2 | 7/2008 | Kisamore et al. |
| 7,441,007 | B1 | 10/2008 | Kirkpatrick et al. |
| 7,533,096 | B2 | 5/2009 | Rice et al. |
| 7,568,109 | B2 | 7/2009 | Powell et al. |
| 7,571,427 | B2 | 8/2009 | Wang et al. |
| 7,765,525 | B1 | 7/2010 | Davidson et al. |
| 7,805,317 | B2 | 9/2010 | Khan et al. |
| 7,805,710 | B2 | 9/2010 | North |
| 7,810,070 | B2 | 10/2010 | Nasuti et al. |
| 7,846,023 | B2 | 12/2010 | Evans et al. |
| 8,028,269 | B2 | 9/2011 | Bhatia et al. |
| 8,056,092 | B2 | 11/2011 | Allen et al. |
| 8,095,910 | B2 | 1/2012 | Nathan et al. |
| 8,132,156 | B2 | 3/2012 | Malcolm |
| 8,209,738 | B2 | 6/2012 | Nicol et al. |
| 8,234,622 | B2 | 7/2012 | Meijer et al. |
| 8,245,215 | B2 | 8/2012 | Extra |
| 8,352,464 | B2 | 1/2013 | Fotev |
| 8,396,890 | B2 | 3/2013 | Lim |
| 8,438,558 | B1 | 5/2013 | Adams |
| 8,443,291 | B2 | 5/2013 | Ku et al. |
| 8,464,240 | B2 | 6/2013 | Fritsch et al. |
| 8,498,473 | B2 | 7/2013 | Chong et al. |
| 8,504,803 | B2 | 8/2013 | Shukla |
| 8,631,458 | B1 | 1/2014 | Banerjee |
| 8,682,083 | B2 | 3/2014 | Kumar et al. |
| 8,713,003 | B2 | 4/2014 | Fotev |
| 8,769,482 | B2 | 7/2014 | Batey et al. |
| 8,819,241 | B1 | 8/2014 | Washburn |
| 8,832,048 | B2 | 9/2014 | Lim |
| 8,874,685 | B1 | 10/2014 | Hollis et al. |
| 8,943,493 | B2 | 1/2015 | Schneider |
| 8,965,905 | B2 | 2/2015 | Ashmore et al. |
| 9,104,294 | B2 | 8/2015 | Forstall et al. |
| 9,213,625 | B1 | 12/2015 | Schrage |
| 9,278,284 | B2 | 3/2016 | Ruppert et al. |
| 9,444,844 | B2 | 9/2016 | Edery et al. |
| 9,462,042 | B2 | 10/2016 | Shukla et al. |
| 9,571,332 | B2 | 2/2017 | Subramaniam et al. |
| 9,621,584 | B1 | 4/2017 | Schmidt et al. |
| 9,946,233 | B2 | 4/2018 | Brun et al. |
| 10,289,959 | B2 * | 5/2019 | Kakhandiki ........... G06N 20/00 |
| 2003/0033590 | A1 | 2/2003 | Leherbauer |
| 2003/0101245 | A1 | 5/2003 | Srinivasan et al. |
| 2003/0159089 | A1 | 8/2003 | DiJoseph |
| 2004/0083472 | A1 | 4/2004 | Rao et al. |
| 2004/0172526 | A1 | 9/2004 | Tann et al. |
| 2004/0210885 | A1 | 10/2004 | Wang et al. |
| 2004/0243994 | A1 | 12/2004 | Nasu |
| 2005/0188357 | A1 | 8/2005 | Derks et al. |
| 2005/0204343 | A1 | 9/2005 | Kisamore et al. |
| 2005/0257214 | A1 | 11/2005 | Moshir et al. |
| 2006/0095276 | A1 | 5/2006 | Axelrod et al. |
| 2006/0150188 | A1 | 7/2006 | Roman et al. |
| 2007/0101291 | A1 | 5/2007 | Forstall et al. |
| 2007/0112574 | A1 | 5/2007 | Greene |
| 2008/0005086 | A1 | 1/2008 | Moore |
| 2008/0028392 | A1 | 1/2008 | Chen et al. |
| 2008/0209392 | A1 | 8/2008 | Able et al. |
| 2008/0222454 | A1 | 9/2008 | Kelso |
| 2008/0263024 | A1 | 10/2008 | Landschaft et al. |
| 2009/0037509 | A1 | 2/2009 | Parekh et al. |
| 2009/0103769 | A1 | 4/2009 | Milov et al. |
| 2009/0172814 | A1 | 7/2009 | Khosravi et al. |
| 2009/0199160 | A1 | 8/2009 | Vaitheeswaran et al. |
| 2009/0217309 | A1 | 8/2009 | Grechanik et al. |
| 2009/0249297 | A1 | 10/2009 | Doshi et al. |
| 2009/0313229 | A1 | 12/2009 | Fellenstein et al. |
| 2009/0320002 | A1 | 12/2009 | Peri-Glass et al. |
| 2010/0023602 | A1 | 1/2010 | Martone |
| 2010/0023933 | A1 | 1/2010 | Bryant et al. |
| 2010/0100605 | A1 | 4/2010 | Allen et al. |
| 2010/0138015 | A1 | 6/2010 | Colombo et al. |
| 2010/0235433 | A1 | 9/2010 | Ansari et al. |
| 2011/0022578 | A1 | 1/2011 | Fotev |
| 2011/0145807 | A1 | 6/2011 | Molinie et al. |
| 2011/0197121 | A1 | 8/2011 | Kletter |
| 2011/0276568 | A1 | 11/2011 | Fotev |
| 2011/0276946 | A1 | 11/2011 | Pletter |
| 2011/0302570 | A1 | 12/2011 | Kurimilla et al. |
| 2012/0042281 | A1 | 2/2012 | Green |
| 2012/0124062 | A1 | 5/2012 | Macbeth et al. |
| 2012/0330940 | A1 | 12/2012 | Caire et al. |
| 2013/0173648 | A1 | 7/2013 | Tan et al. |
| 2013/0290318 | A1 | 10/2013 | Shapira et al. |
| 2014/0181705 | A1 | 6/2014 | Hey et al. |
| 2015/0082280 | A1 | 3/2015 | Betak et al. |
| 2015/0347284 | A1 | 12/2015 | Hey et al. |
| 2016/0019049 | A1 | 1/2016 | Kakhandiki et al. |
| 2016/0078368 | A1 | 3/2016 | Kakhandiki et al. |

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

Bergen et al., RPC automation: making legacy code relevant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2008).

Tom Yeh, Tsung-Hsiang Chang, and Robert C. Miller, Sikuli: Using GUI Screenshots for Search and Automation, Oct. 4-7, 2009, 10 pages.

Yu et al., Deploying and managing Web services: issues, solutions, and directions, 36 pages (Year: 2008).

Zhifang et al., Test automation on mobile device, May 2010, 7 pages.

* cited by examiner

ARTIFICIAL INTELLIGENCE AND KNOWLEDGE BASED AUTOMATION ENHANCEMENT

CROSS-REFERENCE TO RELATED APPLICATIONS

This application is a continuation of and claims the priority benefit under 35 U.S.C. § 120 for U.S. patent application Ser. No. 14/939,715, filed Nov. 12, 2015, entitled Artificial Intelligence & Knowledge Based Automation Enhancement, which application is a continuation-in-part of and claims the priority benefit under 35 U.S.C. § 120 for U.S. patent application Ser. No. 62/160,655, filed May 13, 2015, entitled System And Method For Compliance Based Automation; and the priority benefit under 35 U.S.C. § 120 for U.S. patent application Ser. No. 14/834,773, filed Aug. 25, 2015, entitled System And Method For Upgrade Resilient Automation; and the priority benefit under 35 U.S.C. § 120 for U.S. patent application Ser. No. 13/925,522, filed Jun. 24, 2013, entitled System and Method For Enabling Application Discovery by Automation Needs; and the priority benefit under 35 U.S.C. § 120 for U.S. Pat. No. 8,504,803, filed May 26, 2010, System and Method For Creating and Executing Portable Software, the entire disclosures of which are hereby incorporated by reference herein.

FIELD OF THE INVENTION

The present invention relates to information technology software to enable reliable and fault-tolerant application automation by utilizing artificial intelligence and knowledge based techniques.

BACKGROUND OF THE INVENTION

End users of Web task, legacy applications, Apple (Apple is a registered trade mark of Apple, Inc.) or Windows (Windows is a registered trade mark of Microsoft Corporation) based operating systems create few automated processes, that is a series of steps that a user desires to execute on a computer (often at pre-defined times or by touch of a screen or with a click of a button or a mouse). These software processes could be of any type and for any purpose, e.g., business, IT, or requirements to validate software behavior, etc. In some instances, the user desires to create a task, assign properties to The task and to run the task on a local or a remote computer. Desirable applications may be the creation of adapters that enable application automation by collecting automation information; the locating of application controls and tracking changes between an older and newer version of an application; presenting the changes using an exception management model to a user, so that the user can provide feedback in a visual, instead of programmatic manner; storing and incorporating the changes so as to make the adapters resilient to application changes and upgrades.

Traditional automation techniques are limited in their ability to perform automation tasks precisely and reliably, since these techniques do not have prior knowledge of pre-existing system and application conditions. Additionally, the current processing load is often never considered in determining system response, which can be critical in reliably automating tasks on that system. We propose a system and method to enable reliable and fault-tolerant application automation by utilizing artificial intelligence and knowledge based techniques.

SUMMARY OF THE INVENTION

The invention herein discloses a computerized method operable in a computer system to enable updating applications for a computer-to-be-updated based on artificial intelligence methods including:
  a) Determining system automation profiles by relating system processing power, current processing load, application footprint, application characteristics and application performance.
  b) Constructing artificial intelligence based learning mechanisms to derive key automation criteria.
  c) Combining artificial intelligence (AI) based learning on local system with broader learning from multiple similar systems to provide recommendations on automation criteria such as optimal automation speed, best automation technique, and recommendations for optimal delays.
  d) Storing and updating of the automation criteria over the entire period of time during which automation is performed on a system.
  e) Creating portable automation criteria libraries (correlated to a system with a specific automation profile) that can be instantly leveraged on new systems with comparable automation profiles thus providing near-perfect and reliable automation out-of-the-box.

One embodiment of the invention relates to a computerized method for automatically updating a computer application based on artificial intelligence methods including: (a) collecting automation information related to a current application; (b) locating application controls; (c) scanning the computer application to extract data on processing power, load, footprint, and performance attributes; (d) using the data in an automation profile generator for determining a system automation profile; (e) using an artificial intelligence based modeler for analyzing input and output data; (f) and applying the data to an artificial intelligence model for training and predicting performance, and wherein if the training and predicting function is not satisfied during test, the artificial intelligence model is adjusted and the process of creating a satisfactory performance model is repeated, until the training and predicting function is satisfied; (g) then merging the artificial intelligence model within a cloud based database, adjusting the artificial intelligence model to achieve an updated automation criteria with optimal values, wherein the optimal values provide input to an automation criteria library for storing and updating a prior automation criteria; (h) and exporting the upgraded automation criteria values for incorporation in an application on a customer computer, to achieve a reliable automation.

Another embodiment of the invention relates to a non-transitory computer-readable medium having stored thereon computer-readable instructions for scanning one of a computer application or system software for processing power and load; for creating an application footprint, which includes performance attributes; using performance attribute data for determining a system automation profile, which analyzes input/output data and applies the data to an AI model, which includes a training and predicting performance function, and if the train and performance function is not satisfied during a test, adjusting the AI model, and repeating the process of creating a satisfactory performance model, until achieving a satisfactory test outcome; storing the optimal values and updating the prior automation criteria values; exporting the automation criteria library and applying the library to a system for reliable automation.

In yet another embodiment of the invention relates to a computer system for updated applications on a remote computer including: (a) an automation profile generator for determining a computer-to-be-updated computer automation profile as an aggregate function of the data provided by the system's application inspector; (b) an artificial intelligence based modeler for applying artificial intelligence mechanisms and techniques to determine optimal automation criteria based on the system automation profile; (c) a recommendation engine for merging one or more artificial intelligence based modeler results, for performing an aggregate analysis, for adjusting an automation criteria to optimize values; (d) an automation criteria library for storage, update and retrieval; (e) a learning and mechanism for updating the automation criteria over the time during which automation is performed on the computer-to-be-updated; (f) a library porting mechanism for exporting the automation criteria library.

DESCRIPTION OF PREFERRED EMBODIMENT

The present invention will now be described more fully hereinafter with reference to the accompanying drawings, in which preferred embodiments of the invention are shown. This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. In what follows, application software refers to all the computer software that causes a computer to perform useful tasks beyond the running of the computer itself. The disclosure relates to software, which manages and integrates a computer's capabilities, such as the generation of adapters to enable application automation by exposing operations that can be automated, in the form of an API that can be leveraged by various automation engines including Automation Anywhere (found at www.automationanywhere.com). One object of the invention is to assist in automatically upgrading older version applications to newer versions, which in turn serves the user or customer.

U.S. Pat. No. 8,504,803 entitled System and Method for Creating and Executing Portable Software, incorporated by reference herein, demonstrates the creation of commands having single execution features or as part of a several line operation or one of several commands that serves as an application for the inventive features of the process described herein.

The present disclosure deals more specifically with an inventive process for executing applications in a service provider environment required to update applications in a remote computer, generally referred to as a computer-to-be-updated, or a customer computer or environment. The tasks in the service provider environment have one or more of a series of commands, executable as variables by the computer-to-be-updated's application. In the service provider computer environment the tasks are 132 assembled into execution files, which may require validating the tasks and organizing nested tasks, including collecting nested task information for each task, and accounting for all dependencies to insure that files, tasks, and environments for running on one or more computer-to-be-updated computers are present.

The creation of an execution file may include reading the task file, scanning for event dependencies and embedding files and links needed for remote execution of the execution file, storing the dependencies in a dependency file, scanning for security, verifying the task file for proper formatting. In the inventive process, the service provider must have access to, and actually and incorporate the elements of code required for upgrading the customer's computer-to-be-updated computer system.

Figure 1A:
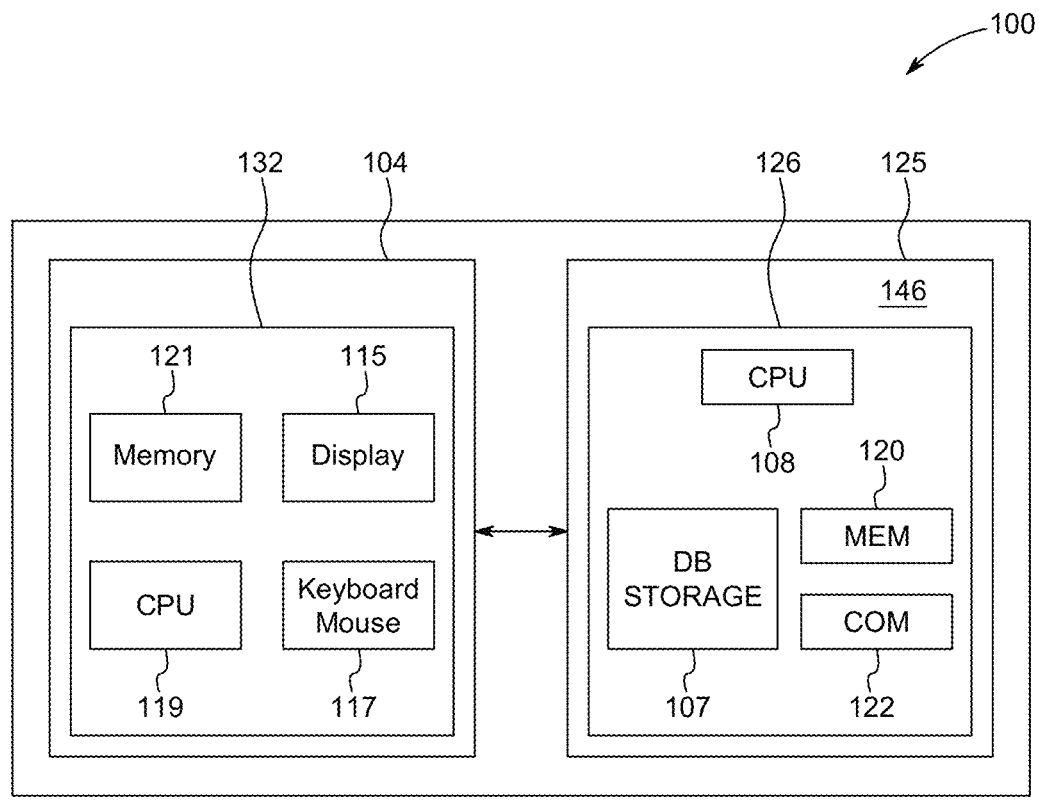
FIG. 1A shows a system for a service provider computer system for creating one or more application execution files in accordance with an embodiment of the present invention.
Figure 1B:
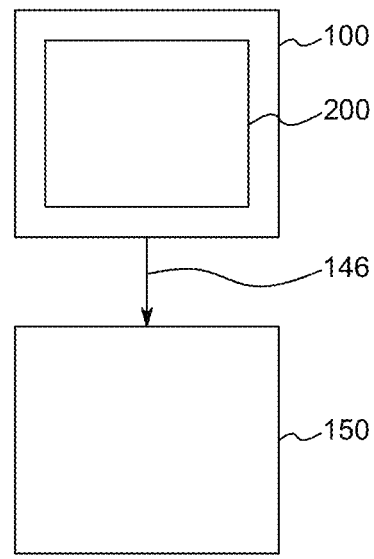
FIG. 1B shows a system for a service provider computer system and a computer-to-be-updated computer in accordance with an embodiment of the present invention.

FIG. 1A represents a system 100 that incorporates a set of modules (FIG. 2, 200), which operate the inventive process 300 (See, FIGS. 3A, 3B, 3C), in order to update a computer-to-be-updated application operating in a customer computer environment (FIG. 1B, 150).

More specifically, the service provider computer 100 and the customer computer-to-be updated 150 (FIG. 1B) typically operate under a remote desktop server protocol. System 100 includes at least one user computer 104 having at least one central processing unit (CPU) 119, which typically is the processor for an operating system and an application resident in memory 121 that contains display 115 and an input device 117 in addition to having the facility to access other computers, such as server 126. The server 126 has at least one central processing unit (CPU) 108, which typically is the processor for an operating system and an application resident in memory 120 that contains a database storage unit 107 and a means for communication 122.

The system 100 may further include a plurality of remote computers (not shown) and further by way of example and not limitation, to a plurality of mobile personal data assistants, tablets and smartphones (not shown) that may access the server 126 and operate the processes disclosed herein.

The system 100 may be configured in many different ways. For example, server 126 may be a conventional standalone server computer or alternatively, the function of server may be distributed across multiple computing systems and architectures. Server 126 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to communications ports that serve as a communication link with other servers, client or user computers. A variety of communications protocols may be part of the system, including but not limited to: Ethernet, SAP, SAS™, ATP, Bluetooth, GSM and TCP/IP.

Controllers (not shown) reside in CPU 108 and CPU 119 that comprise processors (not shown), such as one or more conventional microprocessors and one or more supplementary co-processors such as math co-processors. In CPU 108 at least one such processor is in communication with a communication module 122 that transmits data over a port through which the communication module 122 communicates with other devices such as other servers, user terminals or devices and the Internet 146. The communication port may include multiple communication channels for simultaneous communication with, for example, other processors, servers or client terminals.

The data storage device 107 may store, for example, (i) a program (e.g., computer program code and/or a computer program product for creating, executing and porting the software, as more fully described in FIG. 2, to direct a customer's remote computer processor, in accordance with the present invention, and particularly in accordance with the process 300 (FIG. 3A, 3B, 3C), described in detail hereinafter with regard to the creating, executing and porting the software to achieve the novelty of the invention; (ii) a database adapted to store information that may be utilized to store information required by the program for creating, executing and exporting the portable software to achieve the novelty of the invention.

The program for creating, executing and exporting the portable software may be stored, for example, in a compressed, an uncompiled and/or an encrypted format, and may include computer program code. The instructions of the program, included user generated macros that may include instructions to record and playback executable programs may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The term "computer-readable medium" as used herein refers to any medium that provides or participates in providing instructions to the computer 132 of the computing device (or any other processor of a device described herein) for execution and more particularly for creating, executing and porting the portable software. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

By way of example, various forms of computer readable media may be involved in carrying one or more sequences of one or more instructions to the computer 132 utilized in system 100, (or any other processor of a device described herein) for creating, executing and porting the portable software. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server, such as communication module 122) can receive the data on the respective communications line and place the data on a system bus for the processor. The instructions received by main memory may optionally be stored in memory either before or after execution by the processor. In addition, instructions may be received via communication module 122 and associated port as electrical, electromagnetic or optical signals, which are exemplary forms of wireless communications or data streams that carry various types of information.

Figure 2:
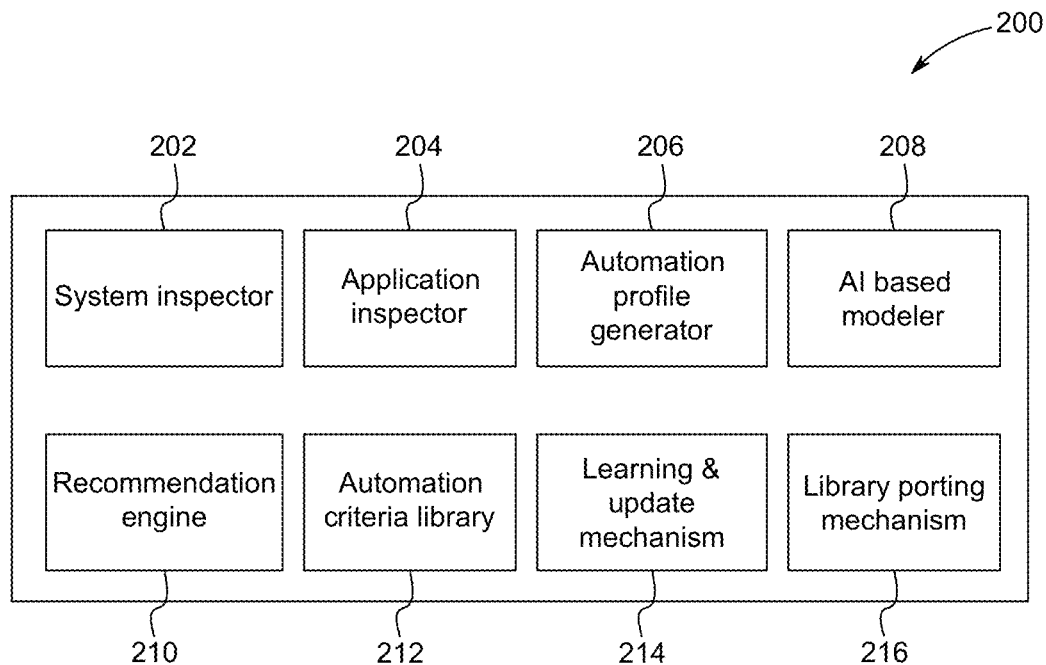
FIG. 2 shows a set of modules for an application automation process in accordance with an embodiment of the present invention.
Figure 3A:
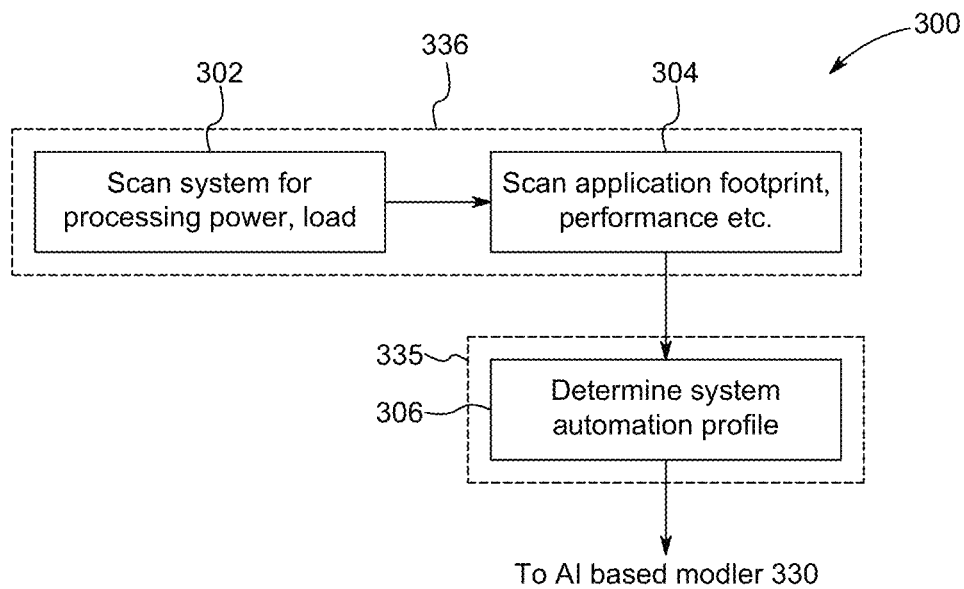
FIG. 3A shows an automation process in accordance with an embodiment of the present invention.
Figure 3B:
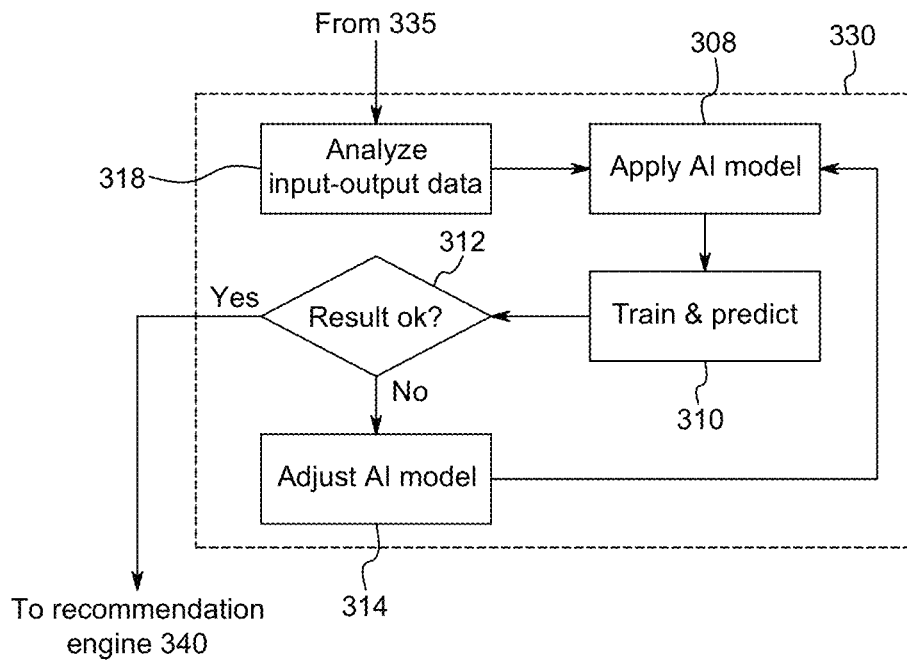
FIG. 3B shows an automation process in accordance with an embodiment of the present invention.
Figure 3C:
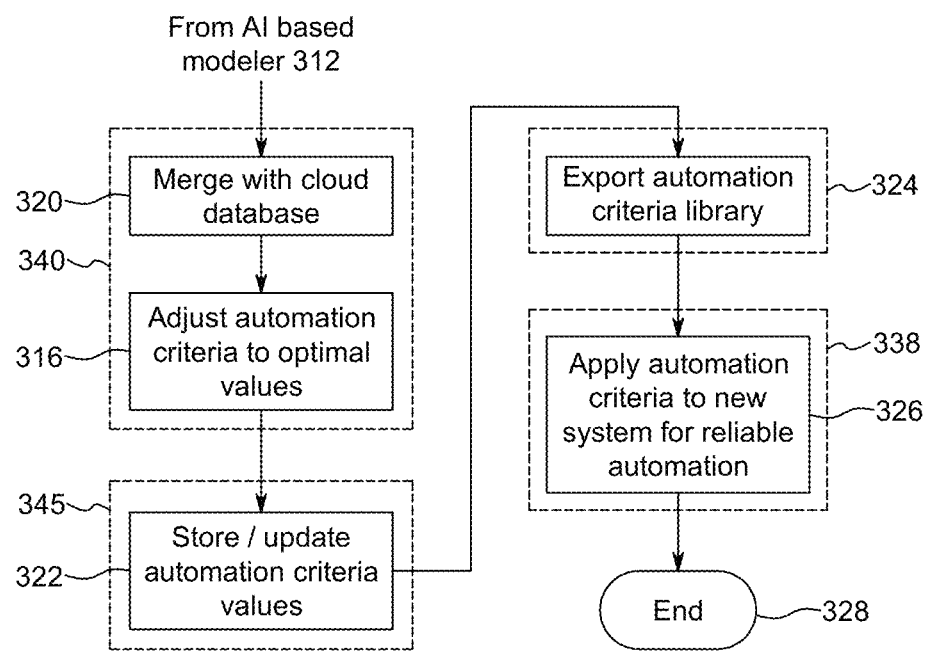
FIG. 3C shows an automation process in accordance with an embodiment of the present invention.

FIG. 2 represents a non limiting embodiment of a system 200 that includes functional modules that perform in accordance with the definitions to follow, and apply the inventive process embodied in FIGS. 3A, 3B and 3C. In one embodiment of the invention, the service provider in fulfilling its provision of services, in accordance with the embodiment of the invention, seeks automatically. i.e., with little or no human intervention, to create an application to update a computer-to-be-updated (FIG. 1B, 150) such that it performs reliably.

In determining a customer's computer system's (FIG. 1B, 150) automation profiles, a set of executable modules 200 (see, FIG. 2) reside in the system 100 computer 132 for determining the status of the computer 150 as that status relates to processing power, current processing load, application footprint, application characteristics and application performance. All the foregoing have processing inputs and outputs, which will more fully explained in connection with a process 300, below. In addition the various executable modules 200 are provided with overall system/task performance parameters and metrics required to carry out the intents of the invention. Further, the modules 200 afford machine learning mechanisms or techniques to be used to build models that predict overall system/task performance for varying levels of the processing inputs. The system then adjusts task buffer times etc., to optimize the automation success (i.e. successful task runs) for various system automation profiles.

The construction of learning mechanisms is key to the derivation of automation criteria. By way of example and not limitation such constructions may include one or more of mechanisms and techniques that include: supervised and unsupervised learning, regression analysis and methods, Bayesian statistical models and clustering algorithms. Many of these techniques are well-known by those of ordinary skill in the art of programming and artificial intelligence.

Turning to FIG. 1A, system 100 combines artificial intelligence based learning functions on its internal learning mechanisms (computer 132), while accepting inputs having with broader learning capabilities from one or more external systems. In some instances, the latter inputs provide recommendations on automation criteria, such as optimal automation speed, best automation technique, and recommendations for optimal delays. These system 100 inputs and automation outputs from the multiple systems are further stored in one or more databases, such as by way of example, data storage device 107.

Turning to FIG. 2, more particularly, a system inspector module 202 performs an analysis of the computer-to-be-updated 150 system and obtains information about its processing power, processing load and other information related to its performance, scalability and speed. An application inspector module 204 performs a deep analysis of the application that it is pointed at on computer-to-be-updated computer 150 and obtains information on underlying application framework, object metadata and properties, object type and associated actions, UI layout and application response times. It also gets information about application performance and latency. This information is critical to automating the application resident on the customer computer 150.

An automation profile generator 206 determines the computer-to-be-updated 150 automation profile as an aggregate function of the data provided by the system 100 and Application Inspectors.

An AI based modeler 208 applies artificial intelligence mechanisms and techniques, as referred to above, to determine optimal automation criteria based on the system 100 automation profile. Automation criteria can be directly used to build reliable automation tasks for the system.

A recommendation engine 210 merges one or more local AI based modeler results, performs aggregate analysis and adjusts automation criteria to optimize values that can be default recommended automation criteria for systems with similar automation criteria. An automation criteria library 212 can be stored in an automation criteria library for storage, update and retrieval.

A learning and update mechanism 214 updates the automation criteria over the entire period of time during which automation is performed on a customer computer 150. A library porting mechanism library porting mechanism 216 provides a means for exporting an automation criteria library for application to any new system, e.g., a customer computer 150, to ensure reliable automation on that system in an instant manner.

One non limiting embodiment of the invention includes a process 300 (FIG. 3A), including a system and application inspector 336, which includes, scanning 302 a computer application or system software in a computer-to-be-updated 150, for processing power and load. The scanning operation 302 output provides input for scanning an application footprint 304, which includes performance attributes. This data, is then used in an automation profile generator 335, in determining a system automation profile 306.

FIG. 3B shows a continuation of process 300 in accordance with an embodiment of the present invention, wherein an AI based modeler 330 includes analyzing input/output data 318 and applying the data to an AI model 308, which includes a train and predict performance function 310. If the train and performance function 310 is not satisfied during test 312, the AI model is adjusted 314 and the process of creating a satisfactory performance model is repeated by applying steps 308, 310 and 312.

If a satisfactory test 312 outcome is achieved, the process 300 proceeds to a recommendation engine 340 (FIG. 3C) that merges the model within a cloud based database 320. The model is adjusted 316 to achieve an automation criterion with optimal values. The optimal values provide input to an automation criteria library 345, which stores and updates 322 the prior automation criteria values. At step 324 process 300, the automation criteria values are exported to a library porting mechanism 338 and applied to a customer computer 150 to achieve a reliable automation 326. The process ends at step 328.

The process 300, artificial intelligence model may utilize one of supervised and unsupervised learning methods, regression analysis, Bayesian statistical models, and clustering algorithms. Also, the process 300 may include determining system automation profiles via one or more of a computer operating system, processing power, processing load, speed, processor type, manufacture application footprint, characteristics and specific application.

Finally, the process 300 may further include comparing system inputs and automation outputs from a local system to stored results to obtain the optimal automation fit for the computer-to-be-updated under examination, as a candidate for updating.

While the present invention has been described with reference to the illustrative embodiments, this description is not intended to be construed in a limiting sense. Various modifications of the illustrative embodiments, as well as other embodiments of the invention, will be apparent to those skilled in the art in reference to this description. It is expressly intended that all combinations of those elements that perform substantially the same function in substantially the same way to achieve the same results are within the scope of the invention. Substitutions of elements from one described embodiment to another are also fully intended and contemplated. It is therefore contemplated that the appended claims will cover any such modifications or embodiments as fall within the true scope of the invention.

What is claimed is:

1. A computerized method operable in a computer system having a service provider computer to enable automated updating of computer applications in a remote computer based on artificial intelligence methods comprising:

collecting automation information related to a current application by comparing system inputs and outputs to and from a service provider computer and a remote computer as a candidate for updating, respectively, to stored results in the remote computer to optimize automation fit in the remote computer, as a candidate for updating;

locating application controls;

scanning the computer application to extract data on processing power, load, footprint, and performance attributes;

using the data in an automation profile generator for determining a system automation profile;

using an artificial intelligence based modeler for analyzing input and output data;

applying the data to an artificial intelligence model for training and predicting performance, and wherein if the training and predicting function is not satisfied during test, the artificial intelligence model is adjusted and the process of creating a satisfactory performance model is repeated, until the training and predicting function is satisfied;

merging the artificial intelligence model within a cloud based database;

adjusting the artificial intelligence model to achieve an updated automation criteria with optimal values, wherein the optimal values provide input to an automation criteria library for storing and updating a prior automation criteria; and exporting the upgraded automation criteria values for incorporation in the remote computer to achieve a reliable automatic update to optimize automation fit in the remote computer, and wherein one or more tasks in the service provider computer execute (a) one or more of a series of commands, executable as variables by the remote computer's application; (b) one or more tasks assembled into execution files, which validate the tasks and organize nested tasks, including (i) collecting nested task information for each task, (ii) accounting for all dependencies to insure that files, tasks, and environments for operating the running on one or more remote computers to achieve optimal automation fit.

2. The method of claim 1, wherein the artificial intelligence model utilizes one of supervised and unsupervised learning methods, regression analysis, Bayesian statistical models, and clustering algorithms.

3. The method of claim 1, further including comparing system inputs and automation outputs from the service provider computer to stored results to obtain the optimal automation fit for the remote computer under examination, as a candidate for updating.

4. The method of claim 1, further including determining system automation profiles for the remote computer via one or more of a computer operating system, processing power, processing load, speed, processor type, manufacture application footprint, characteristics and specific application.

5. The method of claim 1, further including constructing artificial intelligence based learning mechanisms to derive key automation criteria.

6. The method of claim 1, further including combining artificial intelligence based learning on the service provider system a local system, with broader learning from multiple similar systems, to provide recommendations on automation criteria such as optimal automation speed, best automation technique, and recommendations for optimal delays.

7. The method of claim 1, further including creating portable automation criteria libraries, correlated to a system with specific automation profiles.

8. The method of claim 1 wherein automation fit in the remote computer comprises one or more of processing power, load, footprint and performance attributes.

9. A computer system for creating adapters that enable updating new and updated applications in a remote computer comprising:
    (a) means for collecting automation information related to a current application by comparing system inputs and outputs to and from a service provider computer system and a remote computer as a candidate for updating, respectively, to stored results in the remote computer as a candidate for updating to optimize to obtain the optimal automation fit in for the remote computer, as a candidate for updating such as processing power, load, footprint and performance attributes;
    (b) means for locating application controls;
    (c) means for scanning the computer application to extract data on processing power, load, footprint, and performance attributes;
    (d) means for using the data in an automation profile generator for determining a system automation profile;
    (e) means for using an artificial intelligence based modeler for analyzing input and output data;
    (f) means for applying the data to an artificial intelligence model for training and predicting performance, and wherein if the training and predicting function is not satisfied during test, the artificial intelligence model is adjusted and the process of creating a satisfactory performance model is repeated, until the training and predicting function is satisfied;
    (g) means for adjusting the artificial intelligence model to achieve an updated automation criteria with optimal values, wherein the optimal values provide input to an automation criteria library for storing and updating a prior automation criteria; and
    (h) means for exporting the upgraded automation criteria values for incorporation in a remote computer to achieve a reliable automatic update and to optimize automation fit in the remote computer wherein one or more tasks in the service provider computer have (a) one or more of a series of commands, executable as variables by the remote computer application; (b) one or more tasks assembled into execution files, which validate the tasks and organize nested tasks, including (i) collecting nested task information for each task, (ii) accounting for all dependencies to insure that files, tasks, and environments for running on one or more of the remote computers to optimize automation fit in the remote computer.

10. The computer system of claim 9 wherein automation fit in the remote computer comprises one or more of processing power, load, footprint and performance attributes.

11. A computerized method for creating adapters to update a computer-to-be-updated based on artificial intelligence methods comprising:
    (a) collecting automation information related to a current computer by comparing system inputs and outputs to and from a service provider computer and a computer-to-be-updated as a candidate for updating, respectively, to stored results in a remote computer to optimize automation fit in the computer-to-be-updated, as a candidate for updating;
    (b) locating application controls;
    (c) scanning the computer-to-be-updated to extract data on processing power, load, footprint, and performance attributes;
    (d) using the data in an automation profile generator for determining a system automation profile;
    (e) using an artificial intelligence based modeler for analyzing input and output data;
    (f) and applying the data to an artificial intelligence model for training and predicting performance, and wherein if the training and predicting function is not satisfied during test, the artificial intelligence model is adjusted and the process of creating a satisfactory performance model is repeated, until the training and predicting function is satisfied;
    (g) merging the artificial intelligence model within a cloud based database;
    (h) adjusting the artificial intelligence model to achieve an updated automation criteria with optimal values, wherein the optimal values provide input to an automation criteria library for storing and updating a prior automation criteria; and
    (i) exporting the upgraded automation criteria values for incorporation in the computer-to-be-updated to achieve a reliable automatic update to optimize automation fit in the computer-to-be-updated to achieve a reliable automatic update.

12. The computerized method of claim 11 wherein automation fit in the computer to be updated comprises one or more of processing power, load, footprint and performance attributes.

13. The computerized method of claim 11, wherein the artificial intelligence based modeler utilizes one of supervised and unsupervised learning methods, regression analysis, Bayesian statistical models, and clustering algorithms.

14. The computerized method of claim 11, further including comparing system inputs and automation outputs from the service provider computer to stored results to obtain the optimal automation fit for the remote computer under examination, as a candidate for updating.

15. The computerized method of claim 11, further including determining system automation profiles for the remote computer via one or more of a computer operating system, processing power, processing load, speed, processor type, manufacture application footprint, characteristics and specific application.

16. The computerized method of claim 11, further including constructing artificial intelligence based learning mechanisms to derive key automation criteria.

17. The computerized method of claim 11, further including combining artificial intelligence based learning on the service provider system a local system, with broader learning from multiple similar systems, to provide recommendations on automation criteria such as optimal automation speed, best automation technique, and recommendations for optimal delays.

18. The computerized method of claim 11, further including creating portable automation criteria libraries, correlated to a system with a specific automation profiles.

* * * * *